Aug. 7, 1951     H. L. HARTMAN     2,563,649
TWO-SPEED FRICTION DRIVE TRANSMISSION
FOR PHONOGRAPH TURNTABLES
Filed Oct. 13, 1948     3 Sheets-Sheet 1

Herbert L. Hartman, INVENTOR.

BY Frank M. Hough
and J. H. Slough

Herbert L. Hartman
INVENTOR.
BY Frank M. Slough
and J. H. Slough

Aug. 7, 1951     H. L. HARTMAN     2,563,649
TWO-SPEED FRICTION DRIVE TRANSMISSION
FOR PHONOGRAPH TURNTABLES
Filed Oct. 13, 1948     3 Sheets-Sheet 3
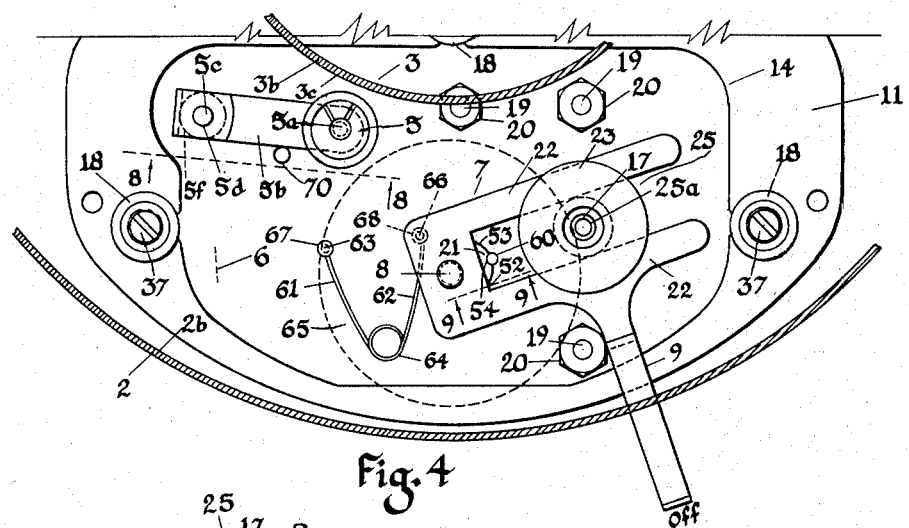
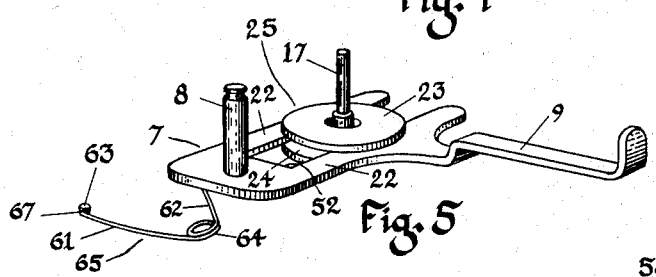
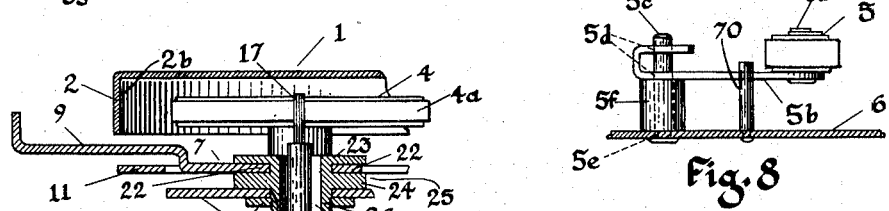
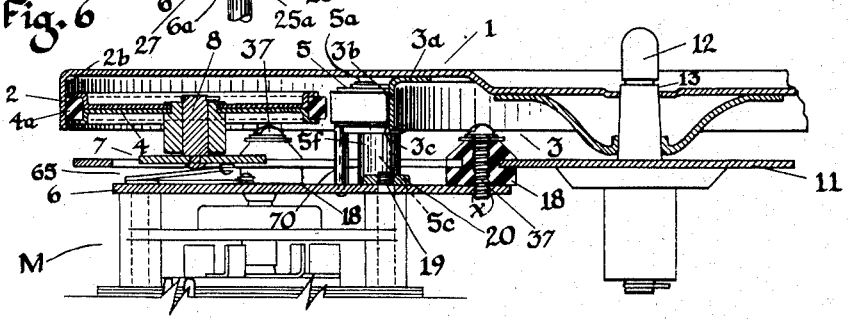
Herbert L. Hartman
INVENTOR.
BY Frank M. Slough
and J. H. Slough Patented Aug. 7, 1951

2,563,649

UNITED STATES PATENT OFFICE 2,563,649

TWO-SPEED FRICTION DRIVE TRANSMISSION FOR PHONOGRAPH TURNTABLES

Herbert L. Hartman, Elyria, Ohio, assignor to The General Industries Company, Elyria, Ohio, a corporation of Ohio Application October 13, 1948, Serial No. 54,316

12 Claims. (Cl. 74—199)

My invention relates to two-speed drives for phonograph turntables and relates more particularly to a transmission mechanism therefor, which may be manually adjusted to frictionally drive a phonograph turntable at either of two widely different rotational speeds.

My present invention involves a mechanism which is distinguished from earlier forms of two-speed drives for the same purpose by the fact that such former designs involve the vertical adjustment of a friction type idler wheel thus requiring that the peripheral flange of the turntable, which is engageable at different levels by said wheel, must at least be of double vertical width thereby increasing the cost of the turntable.

An object of my invention is to provide a two-speed friction drive mechanism comprising an idler wheel which is adapted to frictionally communicate rotational movement to either of a pair of relatively concentric pendant annular elements of a turntable which are of different dimensions, from a driving pulley which is rotated by an electric motor, whereby the turntable is rotated at either of two rotational rates which are substantially inversely proportional to the difference in diameters of the annular surfaces of said annular pendant elements, which are alternately frictionally driven by said idler wheel.

Another object of my invention is to provide a two-speed friction drive mechanism for driving phonograph turntables at predetermined different rotational rates responsive to a simple lateral adjustment movement of the idler wheel.

Another object of my invention is to provide an improved two-speed friction drive mechanism for phonograph turntables which is simple and inexpensive in construction and reliable in use.

Another object of my invention is to provide for the improved two-speed friction drive mechanism of any or all of the previous objects wherein the idler wheel may be readily and effectively set to a neutral, inoperative position wherein its annular driving surface is entirely disengaged during non-use of the mechanism.

Other objects of my invention and the invention itself, will be readily understood by those skilled in the art to which my invention appertains, by reference to the following written description of a preferred embodiment of my invention wherein reference is had to the following drawings, whereof.

Fig. 1 is a sectional view of the phonograph turntable of my invention, the idler wheel associated therewith being shown in solid, dotted and dot-dash lines to indicate three different positions thereof;

Fig. 2 is a top plan view of the dual speed mechanism of my invention, a portion of each of the turntable flanges being shown in cross-section, certain of the operating parts being shown in the positions which they assume when the mechanism is set at 33 R. P. M.;

Fig. 3 is a view similar to that of Fig. 2 showing the parts in the position in which they are placed when the mechanism is set at 78 R. P. M.;

Fig. 4 is a view similar to that of Figs. 2 and 3 and showing the mechanism in "off" position;

Fig. 5 is a perspective view of the tubular slide holder and slide mechanism of Figs. 2 to 4 inclusive;

Fig. 6 is a fragmentary sectional view taken from the line 6—6 of Fig. 2;

Fig. 7 is a cross-sectional view of the mechanism of my invention taken from the line 7—7 of Fig. 2;

Fig. 8 is a view taken from the line 8—8 of Fig. 4;

Figure 1:
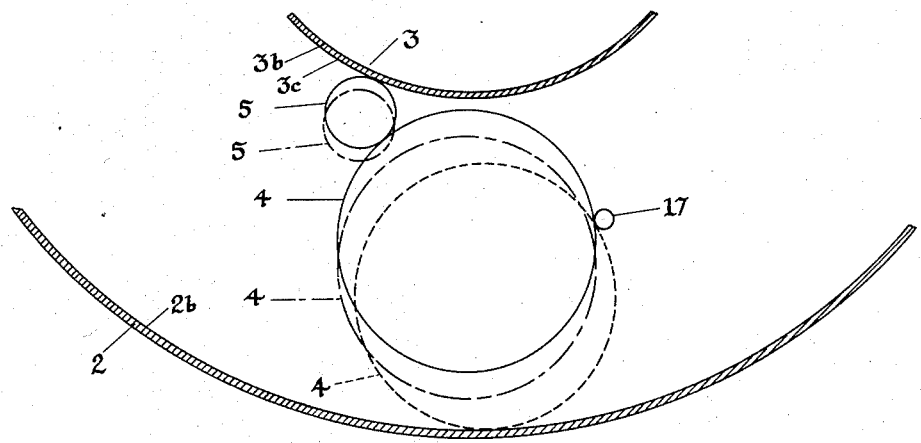
Figure 10:
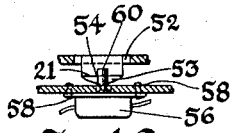
Fig. 10 is an end view of the parts of Fig. 9.
Figure 9:
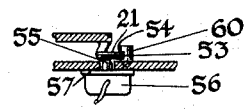
Fig. 9 is a fragmentary sectional view of the switch and slide projection.

Referring now to the drawings in all of which like reference characters are used to designate like parts, the apparatus of my present invention is primarily characterized by the provision of a turntable 1 which, beside the usual peripheral pendant turntable flange 2, is provided with a similar pendant flange 3 which initially is in the form of an annular member having a radial flange 3a and a tubular flange 3b, the latter affording by its outer convex surface 3c a truly cylindrical surface adapted to be frictionally engaged by a secondary idler pulley 5 which is adapted to be interposed between said surface 3c of the flange 3 and peripheral rubber tread 4a of the relatively larger idler wheel 4.

Said secondary idler pulley 5 is required to be interposed between the idler pulley 4 and the flange 3, in order to insure that the turntable will be rotated in the same direction regardless of whether the rotative driving force is applied to the flange 2 by direct engagement by said idler wheel tread 4a, or applied to the flange 3 through said secondary idler pulley 5. A stop post 70 for said pulley 5 limits the movement of said pulley.

Figure 11:
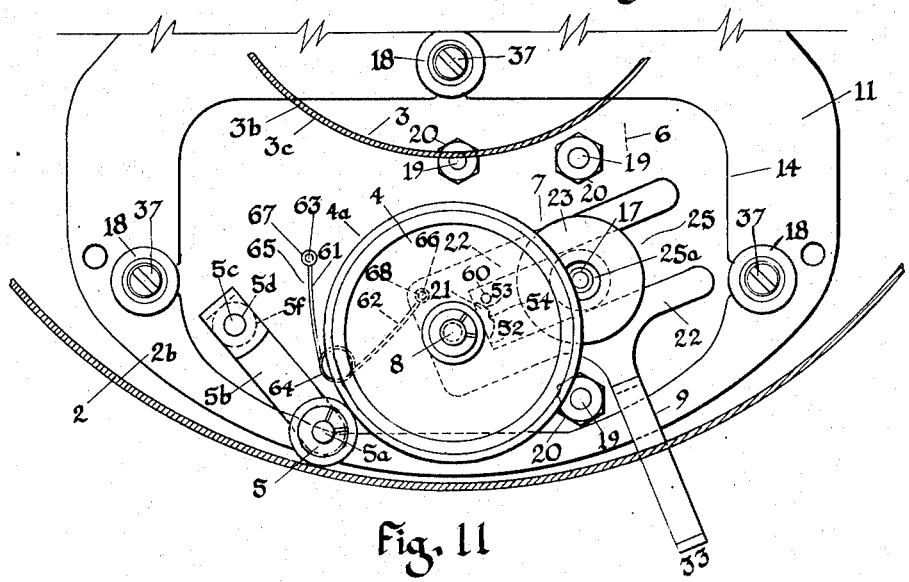
Fig. 11 is a view similar to that of Figs. 2, 3, and 4 but showing a second embodiment of my invention.

In another obvious embodiment of my invention, as illustrated in Fig. 11, the reversing pulley 5 would be disposed between the idler wheel periphery and the outer surface of the turntable flange 2, if the direction of rotation of the motor shaft 17 were reversed from the counter-clockwise direction as indicated in Fig. 1 and which is the usual direction of rotation for motors of the type commonly employed to drive phonograph turntables.

Figure 2:
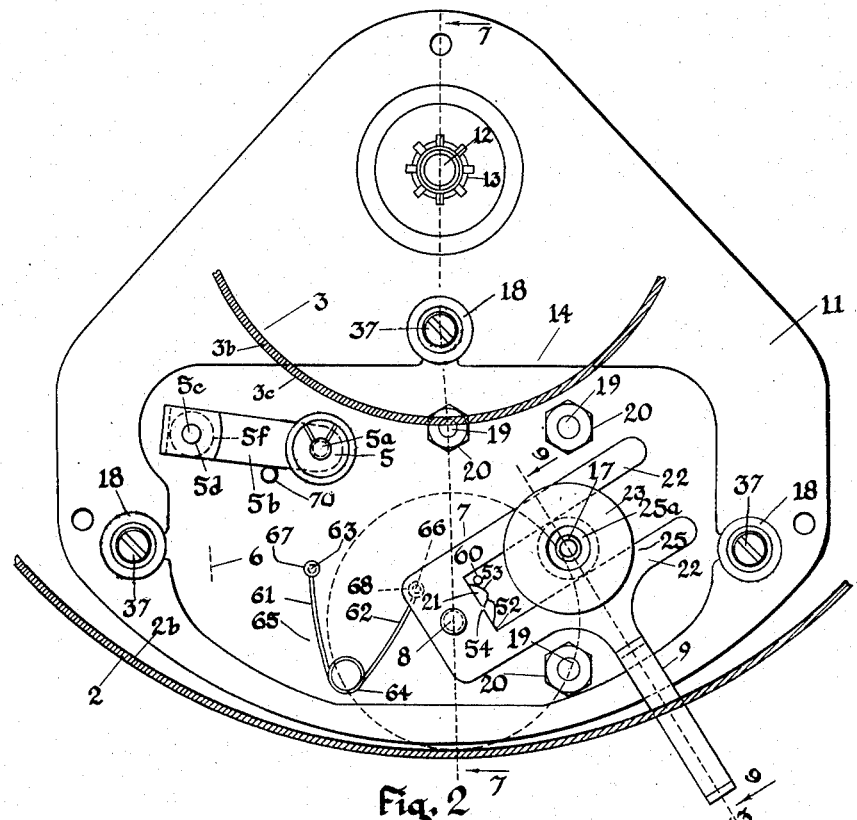
Figure 3:
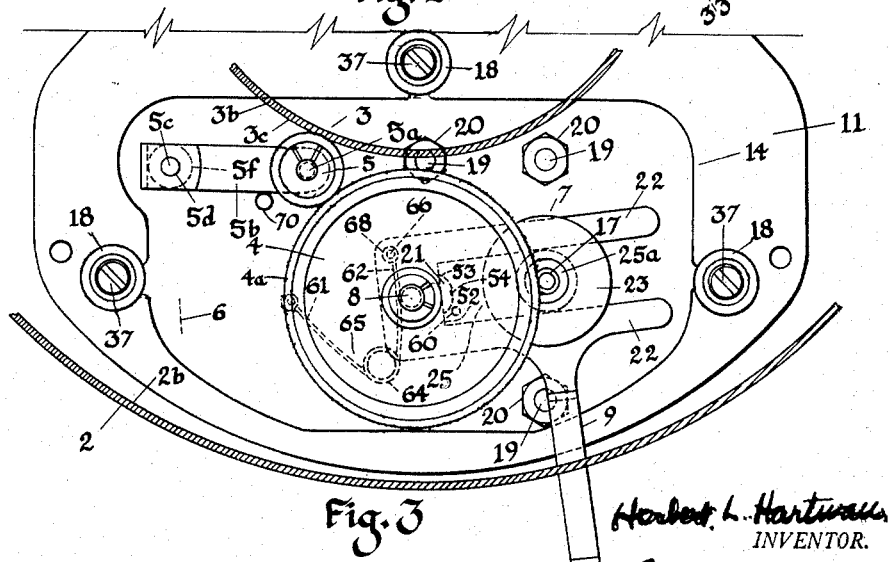

Figs. 1 and 3, in the embodiment illustrated, show by a solid circular line 4a the positioning of the peripheral rubber tread surface of the idler wheel 4 when interposed between the pulley 5 and the motor pulley 17 and being out of engagement with the inner surface 2b of the outermost turntable flange 2; the dotted line circle of Figs. 1 and 2 shows the position of such tread surface when the idler wheel is engaged with and communicates rotary motion from the motor shaft pulley 17, and the inner surface 2b of the peripheral turntable flange 2.

It is to be noted that the dotted-dash circle 4a of Figs. 1 and 4, representing the peripheral tread surface of the idler wheel, shows such surface out of peripheral engagement with any of the pulleys 5 or 17 and out of engagement with either of the flanges 2 and 3, this being the position taken by said idler wheel when the apparatus of the present embodiment is in its "off" or neutral, inoperative adjustment position.

With the above understanding of the primary principles which are herein utilized, the various elements which are shown by the drawings present in the illustrated embodiment will now be described.

The apparatus of my invention is preferably mounted on a plate 11 of any suitable form to provide a bearing mount for a turntable post 12 which is seated in a bottom end and radial bearing unit 13, and is cut away to provide a large opening at 14, the cut away portion in the form of a smaller plate being utilized as a supplemental plate 6 which is pendantly supported by machine screws 37 and rubber grommets 18 slightly below the level of the main plate, said rubber grommets being employed to relatively separate the machine screws and the metal parts of the two plates from engagement one with the other so as to supply a pendant cushioning mount for the lower plate which is supported from the upper plate, in a well-understood manner.

An electric motor M is pendantly supported from the supplemental plate 6 in any suitable manner, such as by a plurality of machine screws 19 which pass through openings X of the supplemental plate and into threaded upstanding lugs or frame portions 20 of the motor casing. The motor drive shaft, which affords a driving pulley portion 17, extends vertically upwardly from the motor through a suitable opening 6a through the supplemental plate, and said pulley portion 17 is disposed in the same plane as the idler wheel 4, so as to adapt it to be laterally engaged with the peripheral rubber tread 4a of said wheel.

The idler wheel 4 is journalled on a vertical post 8 which is carried by its lower end on a horizontal slide element 7, the slide being of substantially U-form and carrying by its web portion, an adjustment handle 9 which extends from a lateral side of one of the slide arms 22. The slide 7 is generally of the form of that shown in my prior Patent No. 2,421,910 dated June 10, 1947, except for the addition of the adjustment handle 9, which extends laterally from one of the slide arms 22, and an added projection 21 of the web, which extends between the pair of like substantially narrow parallel arms 22. The form of, and purpose of the projection 21 is, hereinafter, more fully described.

The slide arms 22 are interposed between parallel interspaced horizontal radially extending flanges 23 and 24 of a tubular slide holder 25, said holder having its tubular end 26 extending downwardly from the flanges to provide a hub, said end is adapted to be projected through a circular opening 6a of the supplemental plate 6, the holder 25 being clamped to said plate by a clamping nut 27 threaded onto the lower threaded end of the hub 25. The motor is so secured to the supplemental plate as to permit its rotor shaft portion 17 to be projected through the hub bore 25a of the holder 25, the walls of said bore being radially interspaced from said shaft 17 which extends coaxially through the bore.

The flanges 23 and 24, being relatively vertically interspaced, define an annular space between them, and the two arms 22 of the slide 7 are adapted to fit within said space at opposite sides of the hub, so that the slide is adapted to be rotatably swung and longitudinally slid between said flanges whereby variations in the relative disposition of the idler wheel wheel 4 which is carried by the web of said slide may be achieved.

The secondary, or reversing, idler pulley 5 is journalled on a vertical post 5a which in turn is carried on a metal strip 5b, said strip journalled on a pin 5c which loosely projects through apertures 5d of the strip, and being anchored in an aperture of the strip, and being anchored in an aperture 5e of the supplemental plate 6, a spacer 5f being interposed between the strip 5b and the supplemental plate 6. The strip 5b is horizontally swingable about the pin 5c so as to permit the pulley 5 to be simultaneously engaged by the periphery of the idler wheel 4 and the annular surface of the turntable flange 3, responsive to movement of the idler wheel 4 to the position indicated by the solid line 4a, which is the high speed adjustment position of the idler wheel.

The attachment of the handle, or manually operable lever 9, to the slide 7 in such manner as to make it a unitary part thereof, ensures that when the handle is swung from one to the other of its two extreme, or operative, positions that the slide 7 is similarly swung about the axis of the slide holder, or in other words, the axis of the rotor shaft 17.

Adjustment of the idler wheel 4 to the solid line high, or to the dotted line low speed adjustment positions, is readily achieved by swinging the lever handle 9 to its two different operative adjustment positions 78 R. P. M. or 33 R. P. M. respectively. An inoperative adjustment position of the handle 9 is indicated by the legend "off," and said "off" position is, in the present embodiment, disposed intermediate the two operative positions.

With the hand lever 9 in an intermediate "off" position, another instrumentality, namely the projection 21, of the slide web portion, is effective to vary the position of the slide, and of the idler wheel which is carried on the slide. The projection 21 extends from the inner edge 52 of the slide web 7 for a short distance in the general direction of the rotor shaft 17 and between the slide arms 22, and is so constructed as to afford a forward edge 53 which is convexly rounded from its lateral edges toward its center, where said edge 53 is so formed as to provide a substantially arcuate-shaped notch 54.

Additionally, the projection 21 is of transversely concaved form, that is, its longitudinally extending medial portion is disposed at a lower level than its side edges. The purpose of giving the projection 21 a transversely concavely rounded formation is to cause its bottom surface rearwardly of the notch to cammingly engage the upstanding, operating, reciprocable button 55 of an electric switch 56, which is pendantly secured to the supplemental plate in the usual manner as by projecting its externally threaded switch housing stem 59 through an opening 57 of the plate 6 and screw threading a securing nut 58 over said stem at the upper side of said plate.

The switch housing is provided with a pair of normally engaged switch contacts which are serially included in the electrical energizing circuit of the motor M, as is commonly understood, said contacts being separated and said circuit broken whenever the switch button 55 is depressed, as a result of manual positioning of the slide 7 in the neutral or "off" position.

Movement of the slide 7 to said intermediate "off" adjusted position is accompanied by engagement of the forward edge surface 53 of the slide projection 21, by the rounded lateral surface of a stationary upstanding post 60 whose lower end is rigidly secured to the supplemental plate 6, whereupon said post cams said projection and with it the slide and idler wheel in the outward direction with respect to the motor pulley 17 to separate the peripheries of said wheel and pulley.

The shallow notch 54, of the projection 21, receives the cam-post 60 when the lever 9 is adjusted to the "off" position, and the slide, and idler wheel carried thereby, will be retained in such intermediate "off" adjustment position, by virtue of spring pressure of a wire compression spring 65.

The spring 65, formed of wire bent to the general form of a safety pin, is provided with an intermediate, central loop portion 64 and a pair of divergent arms, 61 and 62, both of said arms preferably terminating in terminal loops, 67 and 68, each of which is adapted to receive a headed pin, one of said pins 63, passed through one said terminal loop 67, having its lower end tightly fitted within an aperture of the plate 6, and the other pin 66, projected through the other terminal loop 68, having its lower end tightly fitted within an aperture of the slide web.

The anchored spring ends are so disposed that the spring, as in entirety, acts as a compression spring based at 63 on the supplemental plate and exerting compressive stress against the slide in the direction from the pin 63 to the pin 66, and the spring 65 constantly tends to urge the slide forwardly toward a position which is opposite in direction than is the pin 63 from the pin 66.

The spring 65, being anchored at one end on the plate 6 by the pin 63, and its other end being secured by the pin 66 to one corner of the slide web, and said slide being rotatable about the axis of the motor shaft pulley 17, the spring exerts pressure to yieldingly tend to retain the idler wheel in either extreme position to which it is manually adjusted, and toward the post 60.

The spring 65, will, of course, be more greatly compressed when the slide is adjusted to the "off" position, than at either extreme operative position, this being partially due to the fact that the extremities of the arms of the spring 65 are brought closer together at the mid-part of the arc on which the pin 63 is swung about the axis of the shaft 17, than at portions of said arc which are remote from its mid-point.

The camming of the projection 21 by the cam post 60 increases the compressive action of the spring 65, by forcing its extremities still closer together, while effecting separating movement of the idler wheel tread 4a, with respect to the previously engaged motor shaft pulley 17.

By the instrumentalities above described in each operative position, the compression spring holds the idler wheel firmly against the rotor shaft pulley 17 and also, alternately, holds the idler wheel in peripheral engagement with the secondary idler pulley 5, or the inner surface of the turntable flange 2, responsive to alternate adjustment movements to the "78" R. P. M. or "33" R. P. M. adjustment positions.

The idler pulley 5 being otherwise adapted to freely swing on its journal 5c, will, concurrently with, and responsive to, engagement by the periphery of the idler wheel 4, be forced, by action of the spring 65 upon the idler wheel supporting slide 7, into concurrent frictional engagement with the outer convex surface of the inner turntable flange 3, to drive the turntable at the higher rate of speed which may here be assumed to be at a rate of 78 R. P. M.

When the lever 9 is swung in the counterclockwise direction to remove the idler wheel from engagement with the secondary idler pulley 5, the pulley 5 lacking spring pressure to force it against the flange 3, will be nudged outwardly by said flange while rotating, into a position completely out of engagement with said flange.

Swinging the slide 7 and, therefore, the idler wheel 4 to position the tread of said wheel against the inner annular surface 2b of the outermost turntable flange 2 is achieved by moving adjustment handle 9 to the position indicated by the numerals "33" and, in this case, the idler wheel tread is in concurrent spring pressed engagement with the motor shaft pulley 17, and therefore, said wheel being rotated by said pulley, the outer turntable flange 2 will, except for a slight amount of frictional slippage, be rotated at substantially the same peripheral speed as the peripheral speed of said driving pulley, the same rate of peripheral speed being similarly communicated from the pulley 17 through the idler wheel 4 and secondary pulley 5 to the inner turntable flange 3 in the previously described adjustment position of the idler wheel which is effected by swinging the adjustment handle 9 to the "78" R. P. M. position.

As distinguished from peripheral speed, the rotational rate imparted to the turntable is essentially different when the idler wheel is employed to drive the turntable by engaging its outermost flange than it is when said wheel drives the innermost turntable flange through the reversing secondary pulley 5, the relative rates of turntable rotation in the two cases being substantially in inverse proportion to the diameters of the inner and outer turntable flanges, except for variations in frictional losses, and in the tendency of the motor to reduce its speed upon greater loads, and these sources of variation are capable of being adequately allowed for by providing a driving motor which tends to rotate at a higher rate of speed than is actually required except for the above causes of reducing turntable speed.

With the adjustment handle 9 positioned in the medial or "off" position, the periphery of the idler wheel is, as shown, entirely disengaged from any other driving or driven instrumentality, to wit, the drive pulley 17, the turntable flange 2 or the secondary pulley 5. Thus, when the adjustment handle is moved to the "off" position and the apparatus left in that condition for any considerable length of time, the rubber tread of the idler wheel and of the said secondary roller will not be given a permanent dent or deformation of any kind.

Having thus described my invention which is herein disclosed in a single illustrated embodiment, and with the further disclosure that with a motor driving pulley such as 17 rotatable in the opposite direction, the secondary pulley 5 would be disposed between and simultaneously engaged by the tread of the idler wheel and the inner surface of the outer turntable flange 2 and with said idler wheel alternately adjustable to directly engage the periphery of the inner turntable flange 3, as an alternate embodiment, and it being furthermore understood that my invention may be practised in different embodiments departing substantially widely from the embodiments herein illustrated and/or described.

I claim as my invention:

1. A two-speed friction drive transmission for a phonograph turntable comprising a motor, a shaft therefore having a pulley portion, an idler wheel comprising a rubber or like friction tread, said turntable comprising a pair of annular pendant flanges of substantially different diameters and both being concentric with the axis of the turntable, said flanges, said wheel, and said shaft portion being laterally horizontally alignable, with said wheel disposed between the flanges below the turntable, an idler pulley disposed between said idler wheel and the adjacent surface of a first one of said flanges, manual adjustment means adapted to be given a first adjustment position to dispose the tread of said wheel in concurrent engagement with the peripheral surface of said pulley and with said shaft portion and to concurrently exert pressure upon said idler pulley to cause it to peripherally engage a lateral surface of a first of said flanges, and said means adapted to be moved to an alternate adjustment position and when so moved being adapted to effect such positioning of said wheel as to cause different portions of its tread to make concurrent peripheral engagement with said shaft portion and with the opposing lateral surface of a second of said flanges.

2. The frictional turntable drive substantially as set forth in claim 1, characterized by the provision of spring means constantly exerting pressure tending to laterally force said idler wheel tread against said shaft portion and adapted to resiliently maintain said wheel either in peripheral engagement with said second turntable flange or with said idler pulley according to the adjustment position of said wheel first effected by operation of said adjustment means.

3. The frictional turntable drive substantially as set forth in claim 1, characterized by the provision of a relatively fixed mounting plate for said turntable, and a supplemental support for said motor, and a tertiary mount for said wheel, said tertiary mount being journalled on said supplemental support to permit said wheel to be laterally swung about the axis of the mount journal, and said adjustment means comprising a manually movable adjustment handle adapted when moved to different of two alternate operative positions to laterally swing said idler wheel about the journal axis to effect movement of said wheel to its two different recited operative positions.

4. The friction transmission drive mechanism for phonograph turntables substantially as set forth in claim 1, characterized by said wheel, pulley, and shaft portion all having their operative peripheral surfaces disposed in the same horizontal plane in all adjustment positions of said wheel.

5. A two-speed friction drive transmission for a phonograph turntable comprising a motor, a shaft therefore having a pulley portion, an idler wheel comprising a rubber or like friction tread, said turntable comprising a pair of annular pendant flanges of substantially different diameters and both being concentric with the axis of the turntable, said flanges, said wheel, and said shaft portion being laterally horizontally alignable, with said wheel disposed between the flanges below the turntable, an idler pulley disposed between said idler wheel and the adjacent surface of a first one of said flanges, manual adjustment means adapted to be given a first adjustment position to dispose the tread of said wheel in concurrent engagement with the peripheral surface of said pulley and with said shaft portion and to concurrently exert pressure upon said idler pulley to cause it to peripherally engage a lateral surface of a first of said flanges, and said means adapted to be moved to an alternate adjustment position and when so moved being adapted to effect such positioning of said wheel as to cause different portions of its tread to make concurrent peripheral engagement with said shaft portion and with the opposing lateral surface of a second of said flanges, spring means constantly exerting pressure tending to laterally force said idler wheel tread against said shaft portion and adapted to resiliently maintain said wheel either in peripheral engagement with said second turntable flange or with said idler pulley according to the adjustment position of said wheel first effected by operation of said adjustment means, a relatively fixed mounting plate for said turntable and a supplemental support for said motor, and a tertiary mount for said wheel, said tertiary mount being journalled on said supplemental support to permit said wheel to be laterally swung about the axis of the mount journal, said adjustment means adapted to swing said tertiary mount in two opposite directions to dispose said wheel in a selected one of its two alternative operative positions.

6. The transmission substantially as set forth in claim 5 characterized by said tertiary mount being provided with means whereby the axis of said wheel may vary its radial distance from the axis of said mount journal, and means adapted to yieldably hold said wheel in a laterally adjusted position disposed intermediately of its operative positions wherein the periphery of said wheel is free of engagement with any portion of the peripheral surfaces of said shaft and of said pulley.

7. The friction transmission mechanism as substantially set forth in claim 1, characterized by the said first turntable flange being of less diameter than the said second turntable flange.

8. The friction drive transmission mechanism substantially as set forth in claim 1, characterized by said wheel, pulley, shaft portion and both turntable flanges being at all times disposed in the same plane, and said adjustment means adapted to bodily move said wheel laterally in opposite directions to move it from one to the other of its different operative positions, and by the provision of spring means adapted to exert pressure in an inward relatively radial direction with respect to the wheel axis and substantially toward the motor shaft axis, whereby said spring will by a snap action effect assist the adjustment movement of said wheel in either direction when said wheel is moved nearest either operative adjustment positions.

9. A two-speed friction drive mechanism for a phonograph turntable of the type having a pendant peripheral flange, comprising in combination with said flange a mounting plate disposed in spaced relation with and below said turntable, a second relatively concentric pendant turntable flange of relatively less diameter, a pair of idler pulleys, each provided with a peripheral tread of rubber or like material, a vertical journal for each said pulley, journal supporting means for said pulleys secured to said plate and adapted for horizontal movements thereon so as to permit horizontal movement of said pulleys to respectively effect engagement of said pulleys each with a lateral surface of a different one of said flanges, a motor comprising a vertical rotatable drive shaft having a stationary upper end portion engaged with a primary one, only, of said pulleys adapted for mutual peripheral engagement and a secondary one of said mutually engaged pulleys adapted for relatively concurrent engagement with its respective associated flange, and said primary idler pulley adapted for disengagement from said secondary pulley and engagement only with its own associated turntable flange and concurrently with said motor shaft, and manual adjustment means to shift said primary idler pulley from one to the other of its above recited operative positions.

10. The two-speed friction drive mechanism for a phonograph turntable substantially as set forth in claim 1, characterized by said adjustment means having an intermediate position of adjustment wherein said idler wheel is maintained out of engagement both with said flange and said idler pulley and said adjustment means comprising means operative in said intermediate position to effect lateral displacement of said wheel to disengage its periphery from said shaft pulley portion.

11. A two-speed friction drive mechanism for a phonograph turntable substantially as set forth in claim 9, characterized by said manual adjustment means being provided with an element adapted to engage the journal supporting means for said primary idler pulley when said adjustment means is moved to an intermediate inoperative position of adjustment and adapted when so moved to such inoperative position to effect lateral movement of said primary idler journal supporting means to cause it to disengage the periphery of said primary pulley from said motor shaft.

12. A two-speed friction drive mechanism for a phonograph turntable substantially as set forth in claim 5, characterized by said tertiary wheel mount comprising one element of a pair of elements adapted to be so interengaged when said adjustment means is disposed in an intermediate position of adjustment, and said wheel adapted to be disengaged from said motor shaft responsive to said interengagement of said elements, said wheel being also peripherally disengaged with respect to its associated turntable flange and with respect to said idler pulley, responsive to movement of said adjustment means to its said intermediate position.

HERBERT L. HARTMAN.

REFERENCES CITED

The following references are of record in the file of this patent:

UNITED STATES PATENTS

| Number | Name | Date |
|---|---|---|
| 2,119,218 | Rodger | May 31, 1938 |
| 2,262,731 | Gruber et al. | Nov. 11, 1941 |